Patented Aug. 16, 1938

2,127,490

UNITED STATES PATENT OFFICE 2,127,490

ANTIFOAMING AND ANTIFREEZING MIXTURES

Marcellus T. Flaxman, Wilmington, Calif., assignor to Union Oil Company of California, Los Angeles, Calif., a corporation of California No Drawing. Application February 12, 1935, Serial No. 6,267

21 Claims. (Cl. 252—5)

This invention relates to anti-foaming agents adapted to be employed in anti-freeze mixtures and the like, including alkaline, acid and neutral solutions, and also relates to anti-freeze mixtures containing such anti-foaming agents.

It is more or less common practice to employ in automobile radiators and in analogous uses materials added to water for the purpose of preventing freezing of the water at low temperatures. Some of the more desirable anti-freeze agents, such as glycerin, ethylene glycols, including diethylene glycol, and similar alcohols, are however inclined to foam in use, and in order to make the employment of these anti-freeze materials successful it is important to add thereto agents which will eliminate foaming tendencies or at least reduce them to a non-objectionable point.

The object of this invention therefore, is to present anti-foaming and anti-freeze compositions which avoid foaming tendencies where anti-freeze agents are employed which otherwise have foaming characteristics.

Primarily, the present invention resides in the employment as a foam preventing agent of Montan wax with an oily or other material non-miscible in water. The Montan wax may be employed as such or it may be in saponified form. The material non-miscible in water may be a fatty oil, such as lard oil or a light mineral oil or other non-miscible material such as carbon tetrachloride, the volatile materials however being avoided where the volatility may be objectionable. The addition of such an anti-foaming base of wax and non-miscible material, such as mineral oil or fatty oil, to a water solution of an anti-freeze having a tendency to foam, such as glycerin or diethylene glycol, successfully overcomes undesirable foaming tendencies.

The invention thus resides not only in a composition containing Montan wax and an oily or other suitable material non-miscible in water, but resides also in a non-freezing composition such as a water solution of glycerin having foaming tendencies containing said anti-foaming wax base composition. Where the saponified wax is used in preparation of the anti-foaming agent, it is desirable to employ, in addition to the oil, a material in which the soap is materially soluble, especially at elevated temperatures, such as glycerin or diethylene glycol or the like, to maintain the proper dispersion after addition thereof to the water solution of the anti-freeze agent. This is desired because the saponified wax is not sufficiently soluble in the oil or other material non-miscible in water, whereas the wax itself is appreciably soluble in such oil. In either case however, the distribution of the materials in the place of use, for example in an automobile radiator, is such that the desired functions are always obtained. The invention therefore includes also all of these aspects.

In practicing the present invention the foam preventing agent may be prepared in different ways. Thus, the Montan wax may be dissolved in lard oil or mineral oil, such as mineral seal oil or light lubricating oil, in the proportion of about 1% to 5% of wax in about 99% to 95% of oil, and this employed as anti-foamer to be added subsequently to a water solution of glycerin or diethylene glycol or other glycol or similar agent useful for these purposes and having foaming tendencies. Again the Montan wax may be saponified as with potassium hydroxide in a manner to insure no free alkali and this soap dissolved in a few volumes of glycerin or other water-soluble solvent therefor, preferably one which is also to be used as the anti-freeze agent. Glycerin, the ethylene glycols and the like are apparently true solvents for this soap, and also permit ready dispersion in a water solution. Such solution of saponified wax may be used in either of two ways; (1) by subsequent addition to further amounts of glycerin, or to water, or to water solution of glycerin; or (2) by commingling the saponified wax and glycerin solution with the lard oil or other non-miscible material, and subsequently adding this mixture to water, glycerin or water solution of glycerin either in a radiator for example or to a concentrated glycerin solution to constitute an anti-freeze preparation which subsequently will be introduced into the place of use, such as said automobile radiator. Again, the oil may be added at any stage.

I have found that the Montan wax or saponified Montan wax is highly effective as a medium for inhibiting foam in aqueous solutions or dispersions, provided that it is employed in conjunction with a material non-miscible in water as above mentioned. These materials may be the fatty oils, such as lard oil, castor oil and the like, or mineral oils of appropriate consistency or lighter materials. Thus for use in automobile radiators or in other places where temperatures sometimes reach the boiling point of water, mineral seal oil or light lubricating oils may be employed. Where volatility is no objection, kerosene fractions or heavy kerosene, which are somewhat lighter than the mineral seal oil, may be employed, or where temperatures are low such non-miscible substances as carbon tetrachloride or gasoline may be relied upon. As previously indicated, the anti-foaming base may be prepared by dissolving Montan wax in the oil or other non-miscible material. However, since the wax is not soluble in glycerin or the like, a separation takes place when this solution is added to a glycerin solution. In some instances it is therefore preferable to produce a soap from the wax which is soluble in the glycerin or other foaming anti-freeze agent or in some solvent miscible with such anti-freeze agent. For the purpose of the rest of this description glycerin will be referred to as the solvent for the wax soap and as the anti-freeze agent, and lard oil as the non-miscible agent. Glycerin and like solvents are apparently true solvents for the soap and upon dilution with water cause the wax soap to disperse readily. In preparation of the soap care is taken that no free alkali remains, inasmuch as free alkali also has a tendency to induce foaming. This is conveniently accomplished by employing somewhat less alkali than is necessary to saponify the wax completely.

Preferably a potassium soap is produced by the use of potassium hydroxide sufficient only to saponify about 90% of the wax. Thus a quantity of Montan wax is boiled with a calculated amount of potassium hydroxide in several volumes of water until saponification is complete, whereupon an approximately equal amount of glycerin is added, and to this a quantity of lard oil, for example approximating or slightly less than the total amount of the soap solution. This is called the anti-foaming agent.

In use, this anti-foaming agent may be poured directly into water, such as the water in an automobile radiator, containing the necessary quantity of glycerin as the anti-freeze; or, it may be introduced into a concentrated anti-freeze solution containing, for example, about one part of water to four parts of glycerin, the amount of anti-foam agent so added to said concentrated solution constituting about 1% of the resultant concentrated anti-freeze composition.

Another method of preparing the anti-freeze mixture is to prepare the anti-foaming soap solution in glycerin without oil, and then add part or all of this soap solution to the concentrated glycerin solution and thereafter add the lard oil and any remainder of the soap solution with violent agitation. Where the unsaponified wax is dissolved in lard oil to constitute the base, this solution will be introduced into the same concentrated glycerin solution in proportions to obtain approximately the same effects by the product, for example about 0.01% or 0.015% by weight of wax and 0.5% of oil, as against about 0.05% by weight of saponified wax and 0.5% of oil.

As a specific example of practicing this invention, the anti-foaming agent may be prepared as follows:

Water, about 1000 pounds, or about 40%
Montan wax, about 200 pounds, or about 8%
KOH (dry), about 12 pounds, or about 0.5%
Glycerin, about 1200 pounds, or about 50%.

The wax is added to most of the water and the KOH in solution in the rest of the water is slowly added. The mixture is brought to boiling and boiled until the KOH has combined, for example 20 or 30 minutes, whereupon the glycerine is stirred in and the mass carried at about 200° F. for 10 minutes with agitation. The product is then cooled. During this procedure the water will have been evaporated sufficiently to bring the glycerine content to about 60%. The proportions of the materials may of course be varied except that there must be no excess of KOH after saponification. This mixture after cooling may have an approximately equal quantity of one of the described oils admixed therewith, or not, as above described. Where the Montan wax is dissolved in one of the described oils, it will be added to the oil in quantity approximating 1% to 5% of the oil and simple solution effected by heat and agitation.

As a specific example of a concentrated anti-freeze solution containing the foam preventing agent, the following are employed:

| | Percent |
|---|---|
| Water | about 20 |
| Glycerin | about 79 |
| Lard oil | about 0.5 |
| Anti-foam agent containing saponified Montan wax as described in the next paragraph above | about 0.5 |

The water is charged into a large kettle and about 10% of the glycerin is mixed thoroughly therein. About 25% of the anti-foam agent is added to inhibit foam, the anti-foam agent having been thoroughly mixed before withdrawal from its container. The remainder of the anti-foam agent and lard oil are then added approximately simultaneously with rapid agitation, this addition taking place slowly. The product is somewhat turbid and upon dilution exhibits no persistent tendency to foam when subjected to vigorous agitation. If desired, coloring material may be introduced and likewise a very small percentage of sodium silicate (for example 0.1%) in case it is desired to insure against any possible slight acidity which might be imparted by reason of acid content in the glycerin. This anti-freeze product may then be packaged for use, the use constituting simply its addition to water in desired proportion.

Proportions may be varied considerably and good results still obtained. The foam preventing agent may be used in various solutions, acid and alkaline as well as neutral.

It is to be understood that the disclosures hereof are merely illustrative of the generic invention claimed and are not to be taken as limiting.

I claim:

1. An anti-foaming agent adapted to minimize foaming of aqueous solutions comprising a Montan wax base and an oily material non-miscible in water.

2. An anti-foaming agent adapted to minimize foaming of aqueous solutions comprising a saponified Montan wax, a polyhydroxyl alcohol and an oil material.

3. An agent for depressing foaming in solutions having tendencies to foam comprising saponified Montan wax, glycerin, water, and lard oil.

4. An anti-foaming and anti-freezing solution adapted to minimize foaming of aqueous solutions comprising water, glycerin, Montan wax and lard oil.

5. A non-foaming anti-freeze composition adapted to minimize foaming of aqueous solutions comprising a Montan wax base, an oil, a polyhydric alcohol having foaming tendencies and water.

6. A non-foaming anti-freeze composition according to claim 5 wherein the Montan wax is saponified in the form of a soap soluble in said alcohol.

7. An anti-foaming agent comprising a saponified Montan wax, a water-soluble solvent for said saponified wax, water, and an oily material non-miscible with water and not a good solvent for said soap.

8. An aqueous solution comprising a major portion of water with a constituent imparting foaming characteristics, and a relatively small quantity of a foam minimizing agent comprising a saponified Montan wax, a water soluble solvent for said saponified wax and an oily material non-miscible with water and not a good solvent for said soap.

9. An anti-foaming composition comprising relatively large proportions of an oily material and a polyhydroxyl alcohol, a quantity of water and Montan wax not exceeding approximately 5 percent. of the total.

10. An anti-freezing anti-foaming composition comprising relatively large proportions of an oily material and an anti-freeze agent having foaming characteristics in water solution, a quantity of water and a quantity of Montan wax not exceeding approximately 5% of the composition.

11. An anti-foaming composition according to claim 9 wherein the Montan wax is saponified.

12. A foam reducing agent for foaming aqueous solutions comprising an oily material non-miscible in water and a Montan wax base not exceeding approximately 5% of the foam reducing agent.

13. An anti-foam and anti-freeze composition containing water and glycerin and less than about one percent. of lard oil and less than about 0.1 percent. of a Montan wax base.

14. A method for the preparation of an anti-foam and anti-freeze composition comprising saponifying Montan wax with an aqueous solution of caustic alkali in quantity sufficient to saponify a little less than all of the saponifiable constituents, combining the saponified wax with glycerin to yield a saponified wax content of less than about 10 percent. and combining therewith a quantity of an oily material non-miscible in water.

15. An aqueous medium comprising an aqueous solution otherwise having foaming characteristics containing a major quantity of water and a relatively small quantity of a foam-reducing agent comprising Montan wax base and an oily material non-miscible in water.

16. A method for the suppression of foaming of aqueous solutions comprising adding to an aqueous solution having foaming characteristics, an anti-foaming agent containing a Montan wax base and an oily material non-miscible with water.

17. An agent according to claim 15 wherein the oily material is lard oil.

18. An agent comprising an aqueous solution otherwise having foaming characteristics containing a relatively small quantity of a foam reducing agent comprising Montan wax and an oily material non-miscible in water, the Montan wax not exceeding approximately 5% of the foam reducing agent.

19. A method according to claim 16 wherein the wax base is less than approximately 5% of the anti-foaming agent.

20. A method of treating automobile radiator water and the like comprising supplying to the water a quantity of anti-freeze material imparting foaming tendencies to the water and also supplying an anti-foam agent comprising Montan wax and an oil non-miscible with water.

21. A method according to claim 20 wherein the Montan wax is present in an emulsifiable form.

MARCELLUS T. FLAXMAN.